United States Patent [19]
Tangen

[11] Patent Number: 5,535,106
[45] Date of Patent: Jul. 9, 1996

[54] HIGH VISIBILITY ANIMAL COLLAR

[76] Inventor: Amy J. Tangen, 1050 Jefferson Ave., Miami Beach, Fla. 33139

[21] Appl. No.: 353,552

[22] Filed: Dec. 9, 1994

[51] Int. Cl.$^6$ .................................................. F21L 15/14
[52] U.S. Cl. .......................... 362/108; 362/191; 362/241; 362/251; 362/800; 119/859
[58] Field of Search ............................ 119/859; 362/103, 362/108, 184, 249, 251, 800, 190, 191, 200, 237, 241

[56] References Cited

U.S. PATENT DOCUMENTS

| | | | |
|---|---|---|---|
| 2,378,075 | 6/1945 | Frecska | 362/184 |
| 3,134,548 | 5/1964 | Medina et al. | 362/184 |
| 4,112,482 | 9/1978 | Powell | 362/108 |
| 4,875,145 | 10/1989 | Roberts | 362/103 |
| 4,949,228 | 8/1990 | Lin et al. | 362/800 |

FOREIGN PATENT DOCUMENTS

| | | | |
|---|---|---|---|
| 0490219 | 1/1930 | Germany | 119/859 |
| 2166180 | 4/1986 | United Kingdom | 119/859 |

*Primary Examiner*—Denise L. Gromada
*Assistant Examiner*—Alan B. Cariaso
*Attorney, Agent, or Firm*—Robert M. Downey

[57] ABSTRACT

An animal collar includes an elongate strap and electrical light emitting and reflecting devices individually attached to the strap at spaced intervals therealong. Each of the light emitting and reflecting devices includes a housing with a base and a cover formed of a translucent, light reflective material and attachable to the base to enclose an interior containing a light emitting diode, electric conductors, a battery and a switch to operate the light emitting diode between and on and off condition. Threaded attachment members removably secure each of the light emitting and reflecting devices to an upper surface of the strap.

1 Claim, 1 Drawing Sheet

HIGH VISIBILITY ANIMAL COLLAR

BACKGROUND OF THE INVENTION

1. Field of the Invention

The present invention relates to animal collars with night visibility means, and specifically to an animal collar including a plurality of light emitting and reflecting devices attached thereto.

2. Description of the Related Art

The reduced visibility which motorists experience while driving at night exposes pedestrians, bicyclists and animals to great danger of being struck by a vehicle. To increase visibility at night, most bicycles have reflectors on the wheels or frame which reflect the light from an automobile's headlights so that the driver of the automobile is able to see the bicycle. Various light reflective material has also been developed for use on clothing and shoes, providing greater visibility for pedestrians, such as joggers. In fact, most running and walking shoes and accessories are manufactured to include light reflective means.

More so than bicyclists and pedestrians, who stand considerably high above the ground, animals, such as dogs and cats, are extremely difficult to see at night. Further, unlike people who have a greater awareness of the danger of being struck by a car, animals can sometimes be erratic and confused and will often run in the path of oncoming cars. For instance, if dogs see other animals, they will usually give chase with such intent and focus that they block out their surroundings, running across streets with no regard for approaching cars. Thus, it is not surprising that a much greater number of animals are killed by vehicles than people.

Many people like to bring their pet along with them when walking or jogging and, while the pet owner is usually well equipped for night visibility, the animal is not so fortunate. The more attentive pet owner may provide the animal with a collar having light reflective material. However, a dog's or cat's hair will often cover much of the collar, minimizing the effectiveness of reflective material. Further, unless light (e.g. from headlights) shines directly on the light reflective material, the animal is not easily visible.

Accordingly, there is a need in the pet industry for an animal collar which is highly and easily visible in the dark.

With the foregoing in mind, it is a primary object of the present invention to provide an animal collar having means thereon to make the animal collar highly visible at night or in dark conditions, without having to shine light at the animal.

It is a further object of the present invention to provide an animal collar having one or more light emitting devices secured to the collar so that the collar and animal are easily visible at night from all angles.

It is still a further object of the present invention to provide an animal collar having light emitting and reflecting devices which are removably attached to the collar to facilitate ease of replacement if damaged.

These and other objects and advantages will be more readily apparent in the description which follows.

SUMMARY OF THE INVENTION

The present invention is directed to an animal collar, particularly suited for dogs and cats, and including a plurality of electric light emitting and reflecting devices attached to the collar at spaced intervals therealong. Each of the light emitting and reflecting devices includes a housing having a base and a translucent light reflective cover attachable to the base to encapsulate an interior of the housing. A battery source, electric lamp such as a light emitting diode and circuitry are contained within the housing interior. A switch, accessible on an exterior of the housing, facilitates operation of the electric lamp between an on and off condition. Means to provide continuous illumination or alternatively, intermittent flashing of the lamp may further be provided. In a preferred embodiment, the switch is located on a side of the housing so as to be easily accessible when the collar is fitted to an animal.

Attachment means, such as a threaded fastener element, removably attached to the electric light reflecting devices to the collar at spaced intervals, so that when the collar is fitted to the animal, each of the light emitting and reflecting devices are clearly visible from all angles.

A buckle or other securing means on the collar facilitates attachment thereof around the animal's neck.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
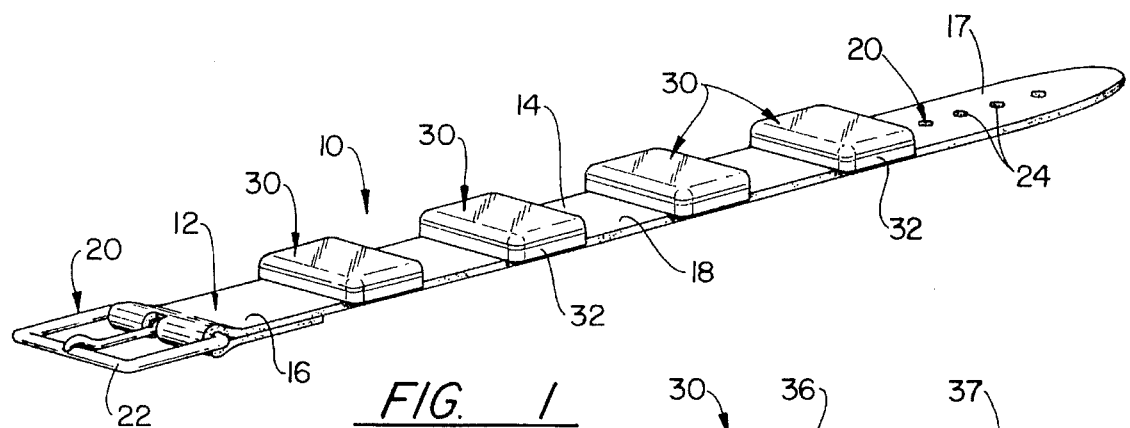
FIG. 1 is a top perspective view of the animal collar of the present invention.

Referring to the several figures of the drawings, there is generally illustrated the animal collar 10 of the present invention, including an elongate strap 12 formed of a woven nylon, canvas, leather or other suitable material. The elongate strap includes an upper surface 14, a lower surface 15, a first distal end zone 16, an opposite second distal end zone 17 and a midzone 18 extending between the opposite distal end zones.

Securing means 20 is provided on the strap for securing the strap about an animal's neck. The securing means 20 may include a buckle 22 fixedly attached on the first distal end zone 16 and a series of apertures 24 on the opposite distal end zone 17, thereby facilitating adjustable attachment to accommodate for varying sizes of animals. Alternatively, other means such as clips, snaps or hook and loop means may be provided to secure the strap about the animal's neck.

The collar 10 further includes a plurality of electric light emitting and reflecting devices 30 each individually and removably attachable to the strap 12 so as to be supported on the upper surface 14 at spaced intervals along the midzone 18, between the opposite distal end zones 16, 17. Each of the electrical light emitting and reflecting devices includes a housing 32 including a base 34 having a bottom surface 35, and a cover 36 formed of a rigid, translucent, light reflective material including a top surface 37. The cover 36 is removably attachable to the base 34 so as to enclose a housing interior 38.

A light emitting source 40, such as a light emitting diode (LED) is contained within the housing interior 38 and is interconnected to a battery 42 by electrical conductors 44 defining a circuit. A relay 46 serves to provide continuous illumination or intermittent flashing of the light emitting source 40.

Switch means for opening and closing the circuit in order to operate the light emitting source 40 includes a movable element 50 slidable fitted to the housing and having a stem 52 extending therefrom so as to be exteriorly accessible on the housing. The moving element 50 further includes a conductive element 54 adapted for engagement with a contact 56 to close the circuit and complete current flow between the battery and light emitting source 40.

Figure 2:
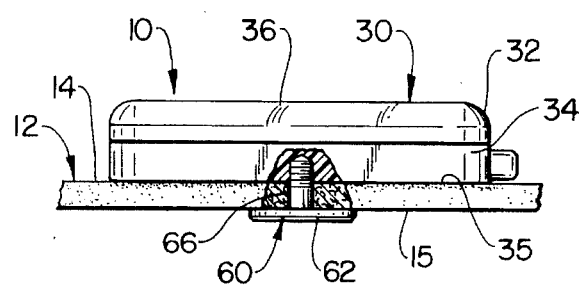
FIG. 2 is an isolated side elevation, in partial section, illustrating attachment of a light emitting and reflecting device to the collar.
Figure 3:
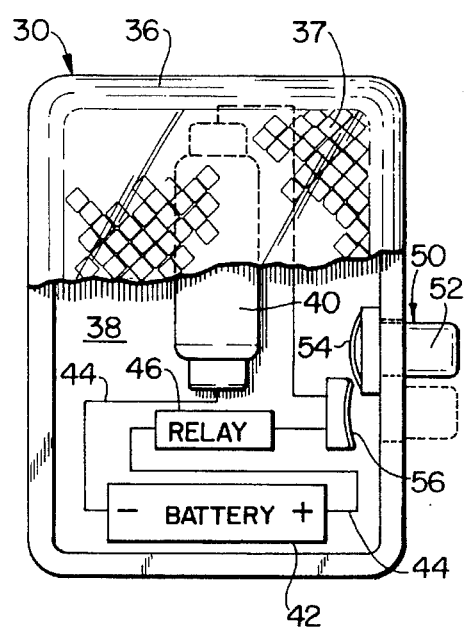
FIG. 3 is a top plan view of one of the light emitting and reflecting devices, in partial cutaway, illustrating the component elements thereof.

Attachment means 60 is provided for individually and removably attaching each of the electrical light emitting and reflecting devices to the upper surface of the elongate strap 12. In a preferred embodiment, the attachment means 60 includes a threaded fastening element 62 including a threaded stem and an enlarged flat head. In this particular embodiment, the elongate strap is provided with a series of spaced apertures 66 for receipt of a respective one of the stems of the fastening element therethrough. Further, the base of the housing includes a threaded bore formed therein structured and disposed for threaded, engaged receipt of the threaded stem therein. Thus, it can be appreciated that each of the light emitting and reflecting devices can be removably attached to the upper surface 14 of the strap 12 as shown in FIG. 2.

While the invention has been shown and described in what is considered to be a practical and preferred embodiment, it is recognized that departures may be made within the spirit and scope of the following claims, which, therefore, should not be limited except within the Doctrine of Equivalents.

Now that the invention has been described,
What is claimed is:

1. A collar for an animal comprising:
   an elongate strap including an upper surface, a lower surface, a first distal end zone, an opposite second distal end zone, a mid-zone between said first and second distal end zones, and a plurality of apertures formed through said strap at spaced intervals along said mid-zone,
   securing means on said opposite distal end zones of said strap for adjustably securing said strap on the animal,
   a plurality of electrical light emitting and reflecting devices attachable to said elongate strap on said upper surface at spaced intervals along said mid-zone, each of said electrical light emitting and reflecting devices including:
      a housing including a base having a bottom surface, and a cover formed of a rigid, translucent light reflective material including a top surface, said cover being removably attachable to said base to enclose an interior of said housing, and said base including a centrally disposed threaded bore formed in said bottom surface,
      a light emitting source contained within the interior of said housing and including at least one light emitting diode,
      conductor means defining a circuit for delivering an electrical current to said light emitting source,
      switch means, exteriorly accessible on said housing, for opening and closing the circuit to operate said light emitting source, and
      relay means for selective operation of said light emitting source between a continuous illuminated mode and an intermittent flashing mode, and
   attachment means for individually and removably attaching each of said plurality of electrical light emitting and reflecting devices to said elongate strap and including a plurality of threaded fastening elements, each of said plurality of threaded fastening elements including a threaded stem structured and disposed for passage through a respective one of said plurality of apertures along said mid-zone of said strap for threaded engagement within said threaded bore of a respective one of said electrical light emitting and reflecting devices to hold said bottom surface of said base in mating engagement with said upper surface of said strap, each of said fastening elements further including an enlarged, flat head adapted for mating engagement with said lower surface of said strap in surrounding relation to said aperture, said flat head being substantially flush with said lower surface when said fastening element is attached to said respective electrical light emitting and reflecting device to thereby prevent uncomfortable protrusion against the animal.

\* \* \* \* \*